March 23, 1954 P. R. LOUGHIN ET AL 2,672,850
CONVECTION FLUID HEAT EXCHANGE SYSTEM
Filed Feb. 1, 1950 8 Sheets-Sheet 1

INVENTORS
PAUL R. LOUGHIN
PAUL M. BRISTER &
BY CHARLES H. WOOLLEY

ATTORNEY

March 23, 1954 P. R. LOUGHIN ET AL 2,672,850
CONVECTION FLUID HEAT EXCHANGE SYSTEM
Filed Feb. 1, 1950 8 Sheets-Sheet 5

FIG. 7

INVENTORS
PAUL R. LOUGHIN
PAUL M. BRISTER &
BY CHARLES H. WOOLLEY
ATTORNEY

March 23, 1954 P. R. LOUGHIN ET AL 2,672,850
CONVECTION FLUID HEAT EXCHANGE SYSTEM
Filed Feb. 1, 1950 8 Sheets-Sheet 7

INVENTORS
PAUL R. LOUGHIN
PAUL R. BRISTER &
CHARLES H. WOOLLEY
BY
ATTORNEY

March 23, 1954 — P. R. LOUGHIN ET AL — 2,672,850
CONVECTION FLUID HEAT EXCHANGE SYSTEM
Filed Feb. 1, 1950 — 8 Sheets-Sheet 8

INVENTORS
PAUL R. LOUGHIN
PAUL M. BRISTER &
CHARLES H. WOOLLEY
BY
ATTORNEY

Patented Mar. 23, 1954

2,672,850

UNITED STATES PATENT OFFICE 2,672,850

CONVECTION FLUID HEAT EXCHANGE SYSTEM

Paul R. Loughin, Westfield, Paul M. Brister, Madison, and Charles H. Woolley, Cranford, N. J., assignors to The Babcock & Wilcox Company, Rockleigh, N. J., a corporation of New Jersey Application February 1, 1950, Serial No. 141,622

19 Claims. (Cl. 122—333)

This invention relates to a heat exchanger of a fluid vaporizing type arranged in combination with heat generating chemical reaction apparatus operable under pressure for the purpose of effecting control of the temperature at which the gaseous products of the reaction are delivered under pressure for further treatment.

The invention involves apparatus adapted for use in which a hydrocarbon such as natural gas or methane is caused to react with a controlled ratio of oxygen under superatmospheric pressure, and the resulting stream of reaction products is cooled to the desired temperature level by the heat exchanger while the stream is maintained at the desired pressure.

The invention involves a unitary elongated pressure vessel enclosing a reaction chamber and convection heat absorption chamber from which the reaction products are delivered at the desired temperature and pressure. The installation, including the pressure vessel, is so constructed that it may be economically maintained even though the structure may be subject to widely different pressure and temperature conditions.

Oxygen and methane are introduced into a reaction chamber under a pressure of the order of 250 to 350 p. s. i. in such proportions that their reaction results in a temperature of the order of 2500° F. The reaction products under pressure are directed over convection heat absorbing surfaces and cooled thereby to a temperature level of the order of 600° F., the absorption of heat generating steam which is otherwise advantageously utilized.

The temperature of the pressure gases passing from the outlet of the pressure confining shell is related to the extent of the heat absorbing vapor generating surface interposed between the reaction chamber and the gas outlet, as well as the internal pressure at which the vapor generating heat exchanger operates. For a given gas temperature in the reaction chamber some regulation of the gas delivery temperature may be effected by modification of pressure at which the vapor is generated.

The apparatus involved in the invention is specifically adaptable as a unit to generate synthesis gas under pressure and at a controlled temperature from natural gas and oxygen as a step in the production of liquid hydrocarbons from natural gas, and is constructed and arranged so that large quantities of the reactants and the reaction products may be handled in a single unit. In the illustrative apparatus a reaction product confining shell of the order of 11 feet in diameter and 83 feet in height is adapted to handle gaseous reaction products of the order of 360,000 lb. per hr. generated at a pressure of the order of 300 p. s. i., delivering the cooled products at approximately 600° F., with a vapor generating pressure of the order of 750 p. s. i.

Within the shell, we provide means for absorbing heat from the gaseous medium (or media) by means including spaced tubes being so arranged as to contact the reactants as the latter pass upwardly through the pressure vessel. Such tubes form part of the vapor generator, many of the tubes being vertically arranged and being in communication at their upper and lower ends with appropriate headers, connected into the vapor generating system.

The upper ends of the vapor generating tubes within the pressure vessel communicate with a liquid and vapor drum arranged exteriorly of the vessel, and the lower ends of the tubes communicate with the liquid space of that drum by connections extending through the pressure vessel wall. Many of the tubes are arranged in circular series of units, each unit including a plurality of horizontally spaced upright tubes connected to upper and lower headers in such manner that the unit may pass into and from the pressure vessel through its gaseous medium outlet. These groups are arranged in a circular series about the wall of the pressure vessel and means are provided for suspending the groups from the upper part of the pressure vessel by tubular connections through which vapor passes to the vapor and liquid drum.

Others of the tubes of the vapor generator within the pressure vessel are arranged as wall tubes extending upwardly in close formation along the pressure vessel wall and acting to cool the wall of a reaction chamber disposed at the lower part of the pressure vessel. These wall tubes are likewise connected with the above indicated vapor and liquid drum in the manner above described. In one example of the use of the invention, means is provided for the burning of natural gas within the reaction chamber with a deficiency of oxygen. These gases react to develop gaseous products which pass upwardly from the reaction chamber and are caused to pass back and forth across the banks of vapor generating tubes before the gases leave the pressure vessel.

The invention will be described by reference to a preferred embodiment shown in the accompanying drawings.

In the drawings:

Fig. 2A is a vertical section on an enlarged scale of the lower part (below the line A—A) of the installation including the reaction chamber;

Figures 1, 3:
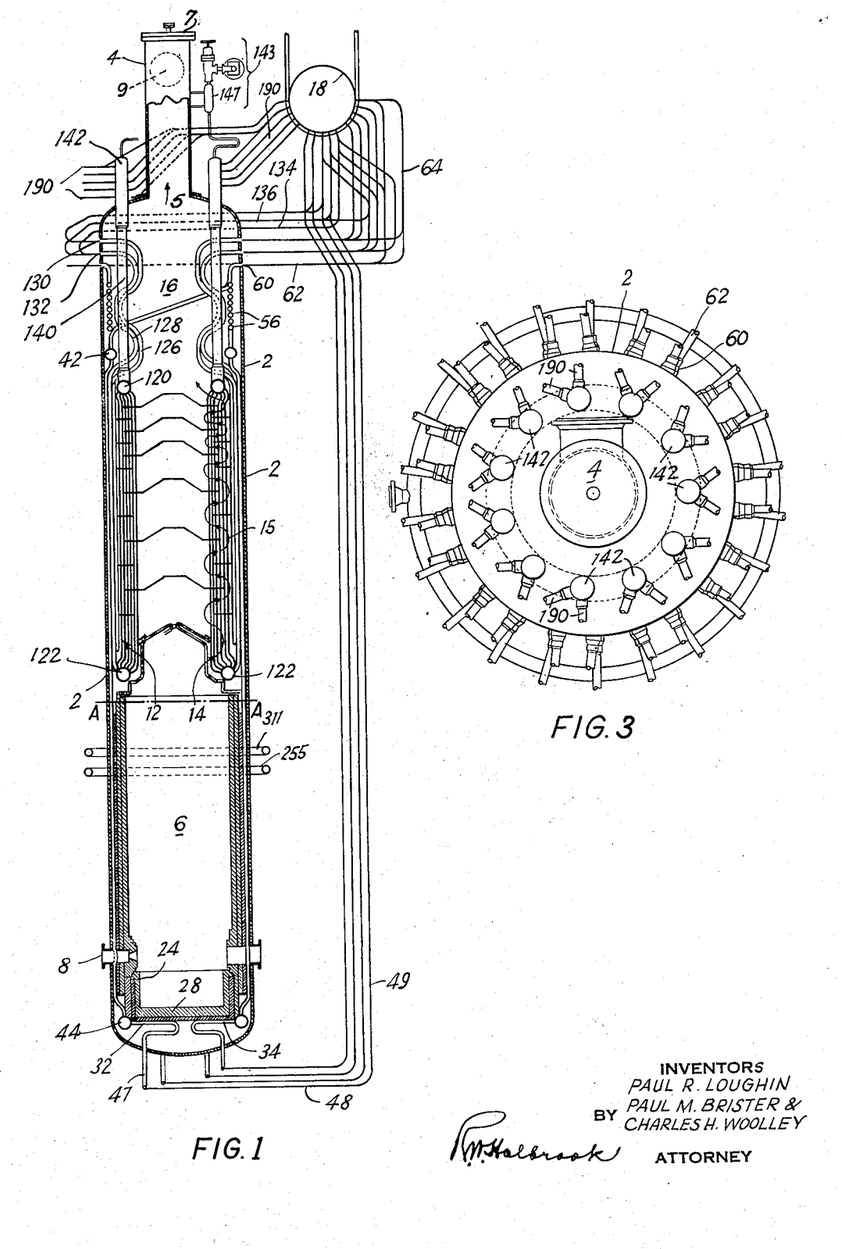
Fig. 1 is a vertical section of the installation.
Fig. 3 is a plan.
Figure 2:
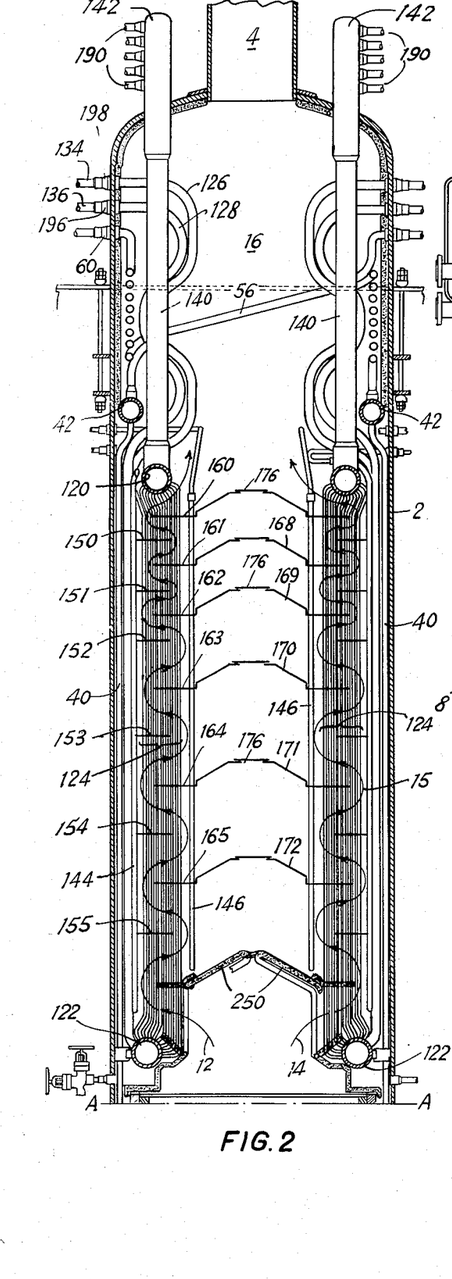
Fig. 2 is a vertical section of the upper part of the installation above the reaction chamber and the line A—A, on an enlarged scale.

Figs. 1, 2, and 2A of the drawings show a pressure vessel of cylindrical shape, including a cylindrical shell 2 formed at its top with an outlet 4 for gaseous products. These products, by way of example, result from the burning of methane, or natural gas in the reaction chamber 6—which burning takes place in a deficiency of oxygen, with the gaseous reactants supplied to the reaction chamber by the associated burners 8 which may be provided in any desired number around the lower part of the reaction chamber. In the reaction of natural gas and oxygen, gaseous media at temperatures of the order of 2500° F., and at a pressure of the order of 300 p. s. i., are produced. These gases flow from the upper part of the reaction chamber in the directions indicated by the arrows 12 and 14 and thence back and forth across the units of spaced vapor generating tubes, as indicated by the arrows 15, until they emerge in the outlet chamber 16. From that chamber they proceed outwardly of the pressure vessel through the outlet 4. In passing over the groups of spaced tubes of the convector units of the vapor generator they act to vaporize a liquid within those tubes, the liquid being supplied by the system hereinafter described, from the liquid space of the exterior vapor and liquid drum 18, Fig. 1. The vapor generated in this process is discharged into this drum for collection in the upper part thereof.

The outlet 4 is formed by an upright large diameter tubular component leading upwardly from a port 5 at the top of the pressure vessel and having a removable closure 7 at its top and a lateral opening 9 for the exit of gases. The removable closure facilitates the removal and replacement of convector units described below.

The reaction chamber at the lower part of the cylindrical shell 2 includes the concentric layers of refractory material such as those indicated at 20—25 in Fig. 2A. It also includes a refractory bottom having refractory layers such as 28 and 30, disposed above radially arranged sections 32 and 34 of downcomer tubes which are provided with metallic extensions 36 (Fig. 4) for thermally protecting the bottom of the reaction chamber.

Figure 4:
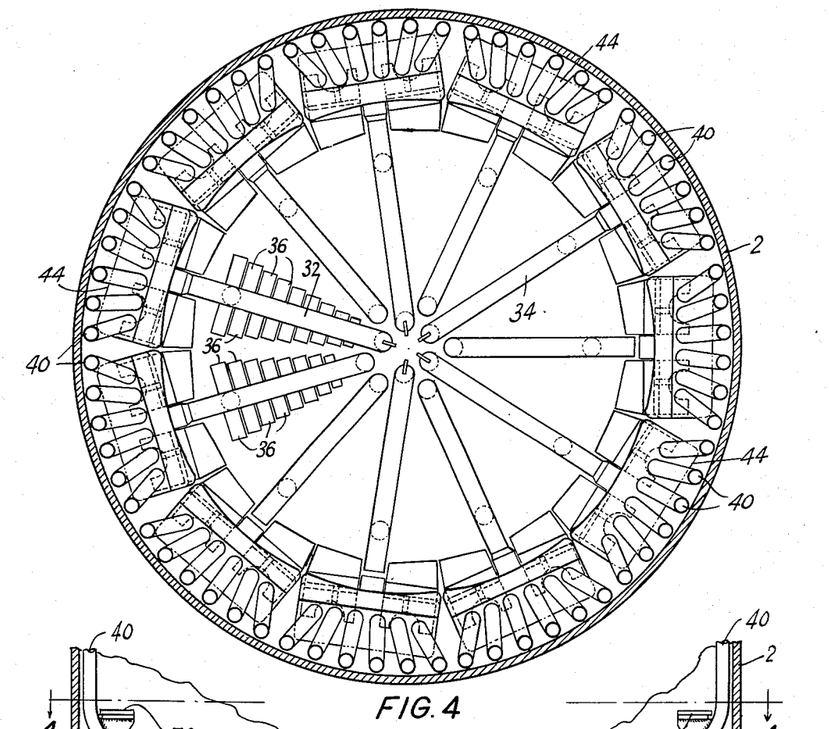
Fig. 4 is a horizontal section on the line 4—4 of Fig. 5.
Figures 15, 16:
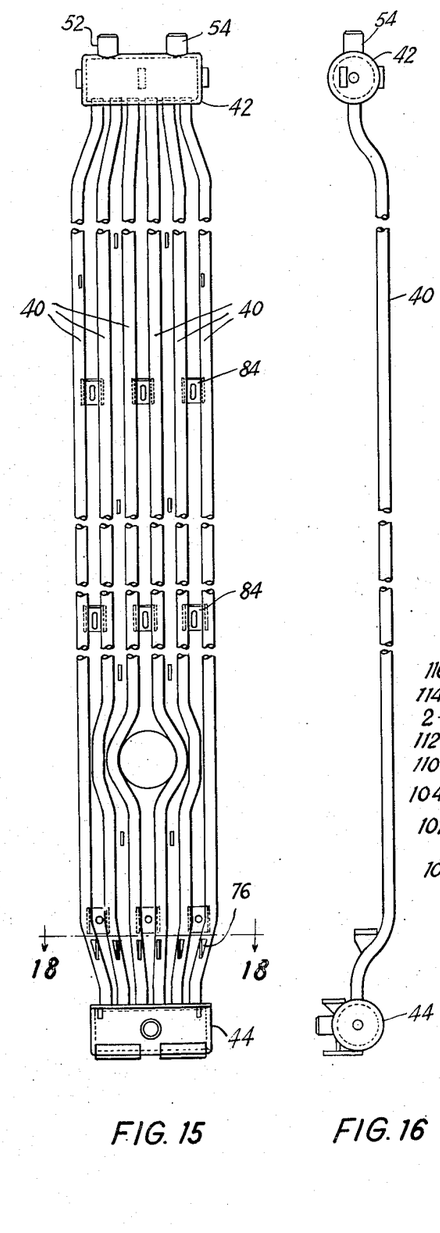
Fig. 15 is an elevation of one of the wall tube units including upper and lower headers with which the tubes of that unit are connected.
Fig. 16 is an end elevation of the wall tube unit shown in Fig. 15.
Figure 17:
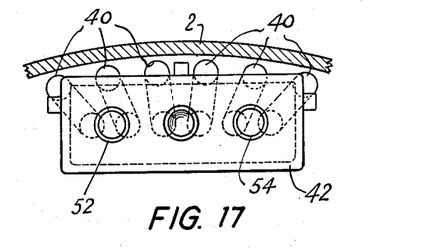
Fig. 17 is a plan of the wall tube unit shown in Fig. 15.
Figure 18:
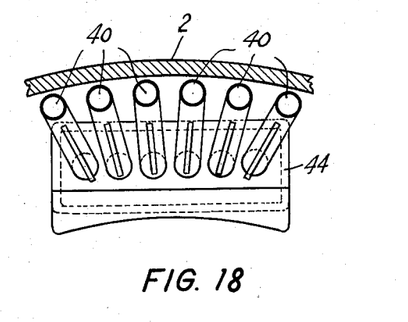
Fig. 18 is a horizontal section of a wall tube unit on the line 18—18 of Fig. 15.

Surrounding the refractory strata of the reaction chamber, and disposed between it and the shell 2, are the wall tubes of a circular series of wall tube units, one of which is shown in Fig. 15. As shown, each unit consists of six wall tubes 40 connecting an upper header 42 with a lower header 44 in such a manner that the entire unit when separated from its tubular connections (as indicated in Fig. 15) may be removed through the pressure vessel outlet 4. These units are arranged in circular formation around the interior of the shell 2 as indicated in Fig. 4, with each of the lower headers, such as the header 44, being supplied with liquid from the liquid space of the drum 18 by means of a downcomer which includes the tubular sections 32, 34, and external sections 46–49, inclusive (Fig. 1). Each upper header 42 is provided with tubular connections such as 52 and 54 (Fig. 15) to which helically formed tubular risers 56 (Fig. 2) are welded after the wall tube units are placed in operative position. These risers 56 extend partially around the upper part of the shell (or the outlet chamber 16) and then pass outwardly of the shell through welded thermal sleeve constructions indicated at 60. They then continue through tubular extensions such as 62 and 64 (Fig. 1), to the drum 18.

Figure 5:
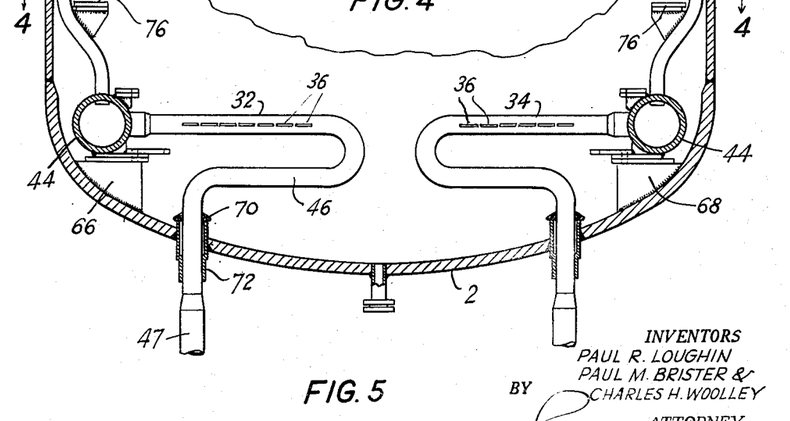
Fig. 5 is a partial vertical section of the lower part of the installation showing the bottom supports for the wall tubes providing thermal protection for the walls of the reaction chamber.

It will be understood that each one of the upper headers 42 is connected to the drum 18 in the above described manner, the arrangement of helical tubes above these headers providing for the upward expansion of the wall tube units from their supports such as 66 and 68 (Fig. 5). This figure also discloses the thermal sleeve elements 70 and 72 through which the downcomer sections, such as 47, are secured in pressure tight relationship to the bottom of the shell 2.

Fig. 5 also discloses bases such as 76 secured to the wall tubes 40 for supporting certain layers of the refractory shell of the reaction chamber (see Fig. 2A).

Figures 6, 11:
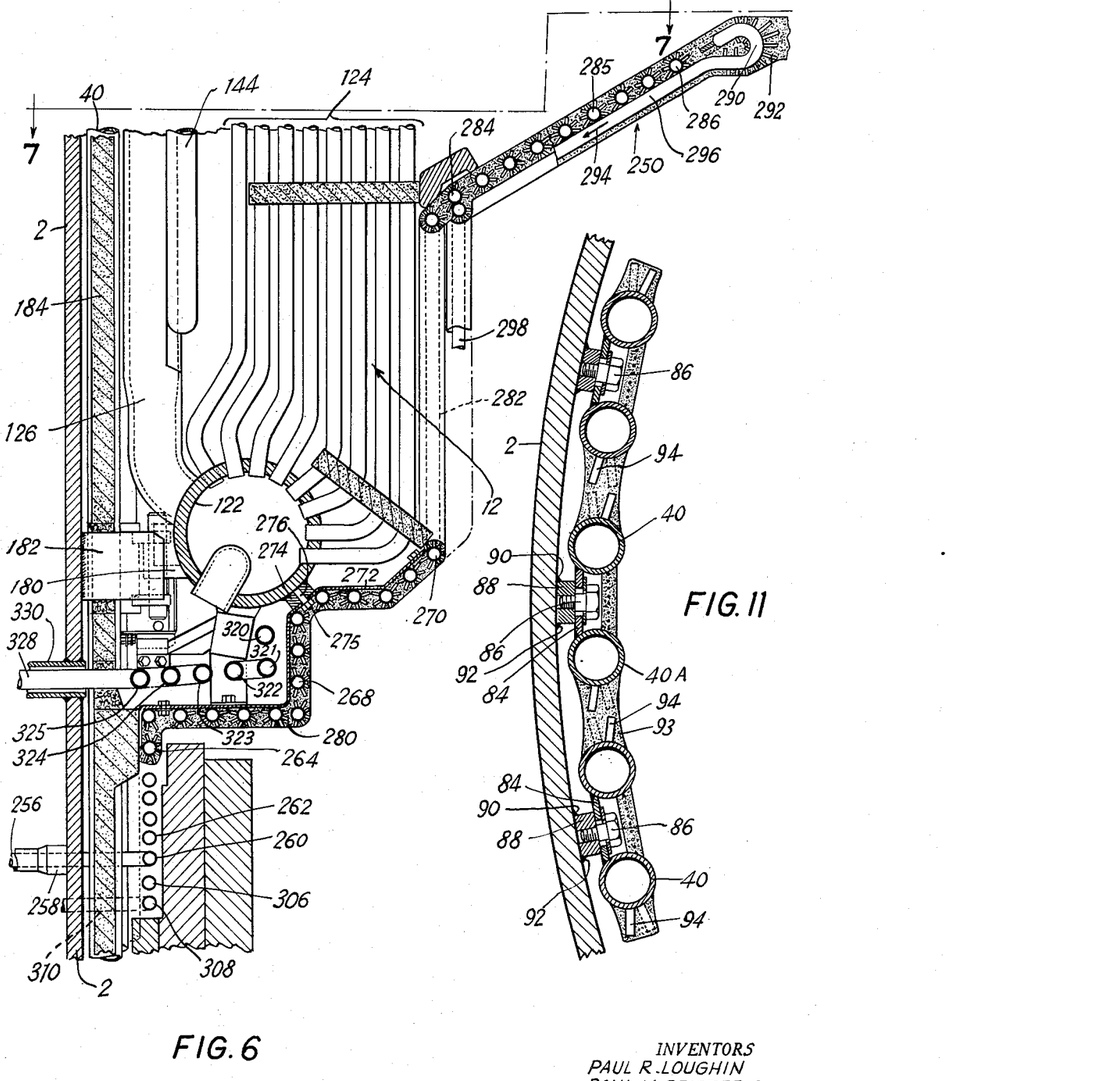
Fig. 6 is a partial vertical section showing on an enlarged scale, the tubes included in the forced circulation baffles affording protection for the lower header of the groups of spaced vapor generating tubes and also forming part of a roof for the reaction chamber.
Fig. 11 is a partial horizontal section on an enlarged scale showing the arrangement of the upright wall cooling tubes, at a position above the reaction chamber.

A typical arrangement of the wall tubes with reference to the shell 2 is indicated in Fig. 11 wherein the tubes such as 40 and 40A are secured to the shell 2 by elements including the plate 84 welded to the tubes 80 and 82 having an opening for a cap-screw 86, the lower part of which is threaded into a body 88 welded to the shell as indicated at 90 and 92. Adjacent pairs of wall tubes are secured to the shell in a similar manner and the space between adjacent tubes is filled with refractory material such as 93 disposed around thermal extensions such as 94 welded to the tubes.

A somewhat modified but typical wall construction at the reaction chamber section of the installation includes the refractory layers 100, 102 and 104 (Fig. 19) disposed in concentric manner outwardly from the interior of the reaction chamber. The layer 104 is spaced from the wall tubes such as 40 and 40A which are arranged in the manner indicated in Fig. 11 and secured to the shell in the manner indicated in the same figure. Between the layer 104 and the tubes, there is a layer of glass wool 110 for protecting the tubes against excessive stresses arising from thermal effects and for preventing the short-circuiting or laning of gases between refractory shell of the reaction chamber and the pressure vessel shell 2. A similar refractory layer 112 is disposed between the wall tubes and the shell 2 of the pressure vessel.

Figure 19:
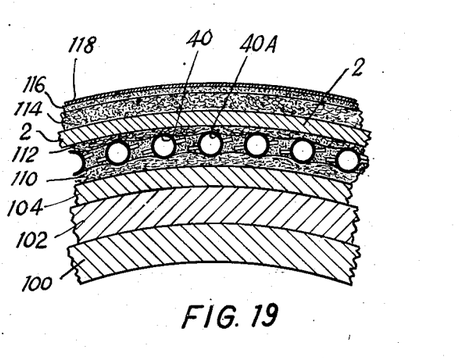
Fig. 19 is a partial horizontal section showing a typical construction of the reaction chamber wall, on an enlarged scale.

Exteriorly of the shell 2, as it is indicated in Fig. 19, are layers of insulation or protective material, such as 116, 114, and 118.

The convector system

Figure 12:
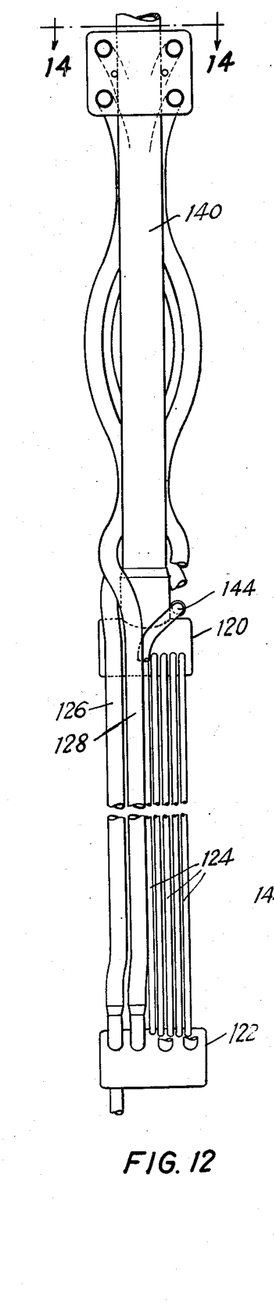
Fig. 12 is a partial elevation of one of the convection units including a group of horizontally spaced tubes connecting upper and lower headers and pendently supported from the top of the pressure vessel by a vapor offtake conduit.
Figure 13:
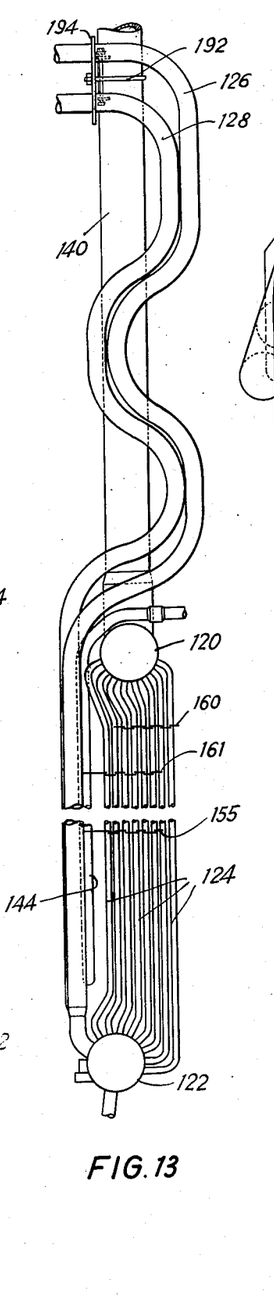
Fig. 13 is an end elevation of the structure indicated in Fig. 12.
Figure 14:
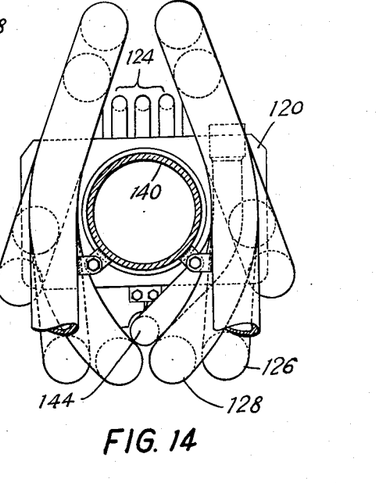
Fig. 14 is a vertical section on the line 14—14 of Fig. 12 showing the arrangement of the elements of the convection unit shown in Figs. 12 and 13.

The major part of the vapor generated in the illustrative installation is generated in a convection system which includes a number of tube bundle convector units, such as the unit indicated particularly in Figs. 12, 13, and 14 of the drawing. Each unit includes a short upper header such as 120 and a similar lower header such as 122 connected by a bank of horizontal spaced upright tubes 124. Each unit also includes four downcomers such as 126 and 128 connected to the lower header as shown and extending upwardly past the upper header to positions such as 130 and 132 (see Fig. 1) at which the downcomers pass through the wall of the upper part of the shell. Beyond these positions, they have such tubular connections as 134 and 136 communicating with the liquid space of the vapor and liquid drum 18.

The parts of the downcomers 126 and 128 immediately above the header 120 are arranged in proximity to the vapor discharge conduit 140 and are formed with a plurality of bowed sections for the purpose of preventing undesirable stresses in the unit as a result of thermal changes.

The vapor discharge conduit 140 is continued upwardly through the shell 2 by an extension 142, which is welded to the shell so that the extension and the conduit 140 pendently support the associated convector unit. Each conduit 140 with its extension 142 is in communication with the drum 18 by means of the circulators 190 and each extension is connected to a vent system 143 (Fig. 1). This system functions to vent air from the convection system in starting up. The vent system includes a valved auxiliary tank or pressure vessel 147 supported by the outlet structure 4.

The convector units supported by the conduits 140 are arranged in circular formation within the shell at a position above the reaction chamber. As indicated in Fig. 1 of the drawings, and later described, means are provided for causing the gases from the reaction chamber to pass recurrently over the tubes of the convector units. The circular arrangement of the convector units is somewhat indicated in Fig. 9 in which the relative arrangement of the vapor discharge conduit 140 in each unit and the other tubular components of each unit are shown. This figure also indicates the relationship of the outer soot blower tube 144 and the inner soot blower tube 146 to the remainder of the components of each convector unit.

Figures 8, 9, 10:
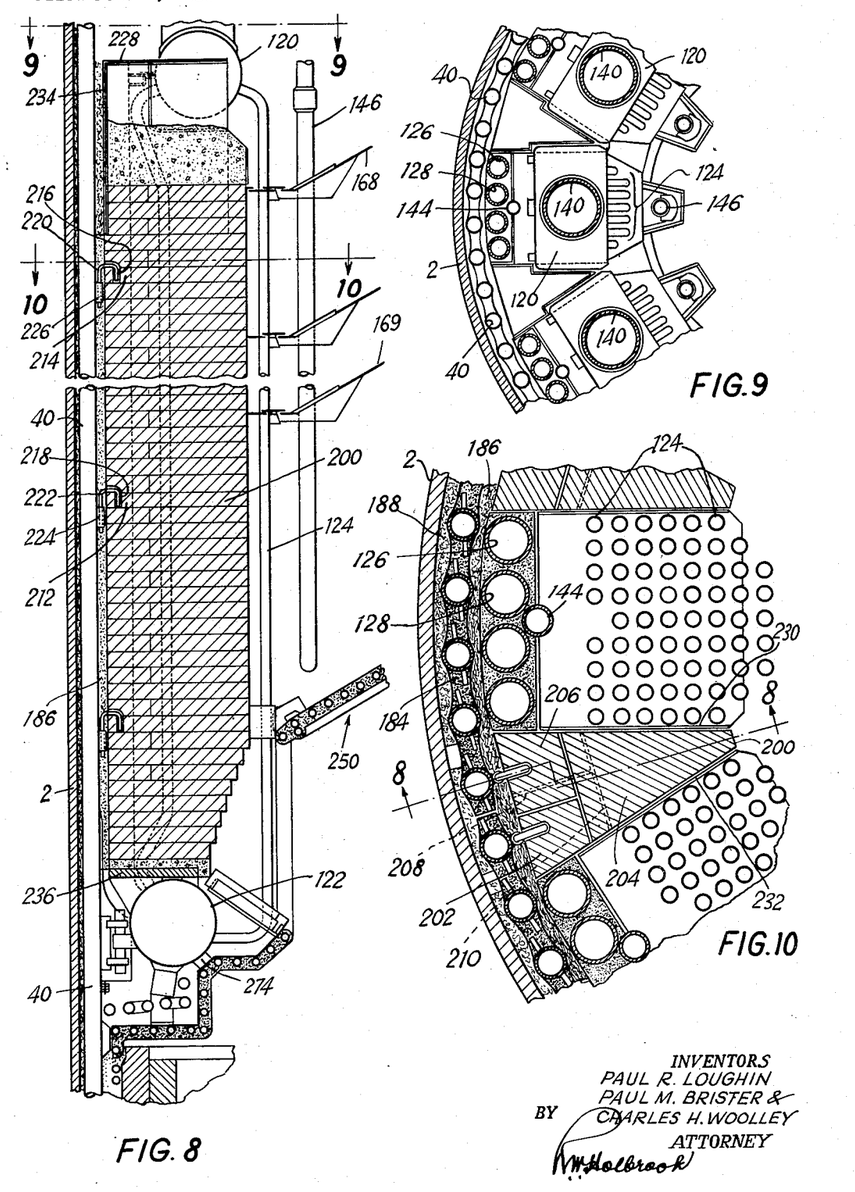
Fig. 8 is a partial vertical section through the upright segmental baffle construction between the groups of horizontally spaced generating tubes disposed above the reaction chamber, at a position indicated by the line 8—8 of Fig. 10.
Fig. 9 is a partial horizontal section on the line 9—9 of Fig. 8, showing the arrangement of the vapor offtake tubes which act as pendent supports for the units including the spaced generating tubes.
Fig. 10 is a partial horizontal section on an enlarged scale, at the plane indicated by the line 10—10 of Fig. 8.

Fig. 10 discloses the arrangement of the tubular elements of a convector unit, showing the arrangement of the elements constituting its bank of tubes, in spaced relationship to the downcomers such as 126 and 128, and the outer soot blower 144.

The spaced elements of the bank of tubes 124 of each unit are maintained in their indicated relationship by a series of horizontal baffles such as 150—155 (Fig. 2) which may be formed by a plurality of metallic plates with notches in their opposite sides to receive the tubes. These baffles co-act with other baffles 160—165 and connected centrally disposed plate baffles such as 168—172, to cause the gases from the reaction chamber 6 to pass back and forth over the tubes of each bank 124 in the manner indicated by the arrows, or flow lines 12 and 14.

It is to be understood that the plate baffles 168—172 are provided with readily removable center portions such as 176, for the purposes of access for inspection or maintenance.

The lower header of each convector unit is provided with a metallic extension such as 180 inter-engaging with a co-acting metallic extension 182 secured to the shell 2 for permitting the header 122 to move vertically in response to thermal changes in the convector unit, while at the same time maintaining the operative relationship of the unit and the shell. The member 182 extends outwardly between two of the wall tubes 40 and through the refractory material such as 184. It also extends through the insulating layers 186 and 188 which correspond to the layers 110 and 112 previously described.

Vapors from each convector unit is discharged from the tubular extension 142 (Figs. 1 and 2) to the drum 18 through a plurality of steam outlet pipes such as 190, the circular arrangement of the extensions 142 being further indicated in Fig. 3 of the drawings.

As indicated in Figs. 12 and 13 of the drawings horizontally disposed upper ends of the downcomers such as 126 and 128 are secured in operative position to the riser or vapor discharge conduit 140 by a clamping device including the U-bolt 192 and plate 194.

Each of the convector units is fabricated in the plant with the parts assembled as indicated in Figs. 12 and 13, and then each unit is brought to its operative position within the shell 2, in the field. This is accomplished by passing the entire unit downwardly through the gas outlet 4 of the shell, the transverse dimensions of the unit being such that adequate clearances are provided for this manner of assembly. The upper ends of the downcomers such as 126 and 128 are brought into registry with the adjacent portions of the vapor discharge lines such as 134, 136, and these aligned parts are then joined by welding. Thereafter, tubular sealings rings or thermal sleeves such as 196 and 198 are welded to the shell and and to the downcomers to provide the requisite pressure seal.

Simultaneously with the placing of a unit within the shell, the co-acting guide extensions 180 and 182 are brought into normal operative relationship to position the lower header 122 of the unit.

All of the baffles 150—172 and 176 are removable, or are so constructed as to permit the removal and replacement of any one of the convector unit tube bundles, in the mannner above described.

The segmental baffle constructions

For thermal protection purposes and for maintaining optimum gas contact with the vapor generating tubes of the convector units, there is an inwardly tapering segmental baffle construction such as 200 (Fig. 10), between adjacent convector units. These constructions consist of refractory material, preferably in the form of non-metallic bricks such as 202, 204, and 206 (Figs. 8 and 10). The bricks in successive horizontal courses are of different size and are arranged in break-joint relationship such as those indicated at 208 and 210 in Fig. 10. They are arranged to form an upright tier, such as indicated in Fig. 8, disposed between the insulating layer 186 and an inward position near the inner faces of the convector units. At vertically spaced positions, some of the bricks such as 212 and 214 of each segmental baffle 200, are provided with vertically extending openings to receive the inner and shorter legs, such as 216 and 218, of U-bolts 220 and 222, the longer legs of which extend through metallic sleeves such as 224 and 226 welded to a wall tube 40. In this manner, the segmental baffle is maintained in its upright position and relative expansion movements of the baffle and the wall tubes are provided for.

At the top of each segmental baffle 200, there is a hood having a roof portion 228 corresponding to the tapering shape of the baffle as it is indicated in Fig. 10. This hood has correspondingly related side walls 230 and 232 (Figs. 8 and 10) which cooperate with a rear wall 234 to form a pocket in which refractory material may be placed to complete the upper portion of the segmental baffle construction.

Each segmental baffle construction is preferably bottom supported upon a plate 236 which may be secured in any appropriate manner, as by securement to the headers 122 of adjacent convector units.

The economizer

The lower headers 122 of the convector units are thermally protected by an economizer having successive tubes arranged as particularly indicated in Fig. 6 to form a shield between the reaction chamber 6 and the header 122. Other parts of the economizer are centrally disposed with reference to the shell so as to constitute the central roof section 250 of the reaction chamber. This roof is spaced from the remaining parts of the economizer so as to provide passage for the gases into the convection section at the positions and in the directions indicated by the arrows 12 and 14 (Fig. 2). Vaporizable liquid enters a section of the economizer and flows from an inlet header 255 through an inlet tube 256 (Figs. 6 and 7) which extends through the wall of the shell 2, this inlet tube being joined to the shell wall in pressure sealed relationship by the sealing ring 258. The flow of the liquid takes place from the inlet tube 256 to a section 260 of a return bend tube in series connection at one end with the next successive return bend tube section 262. The flow further continues through simultaneously arranged successive return bend sections shown in Fig. 6 as immediately above the section 262. It then continues through other return bend tube sections such as 264, 268, and 270 which are secured to a metallic plate 272 disposed in front of the header 122 and secured thereto by means including the elements 274—276. The return bend tubular elements secured to plate 272 are stud tubes with transversely related metallic extensions secured thereto with the tubes and studs covered by refractory material 280 having high heat resistance.

From the return bend tubular section 270 disposed below the gas inlet of the convection section the flow of vaporizable liquid through the economizer continues through the upright refractory covered tubular section 282 to a part of the roof section 250 formed by a platen of serially connected return bend stud tubes such as 284—286. The pertinent parts of the roof section 250 are completed by refractory material covering these return bend tubes and the metallic studs extending therefrom (Figs. 6 and 7).

Figure 7:
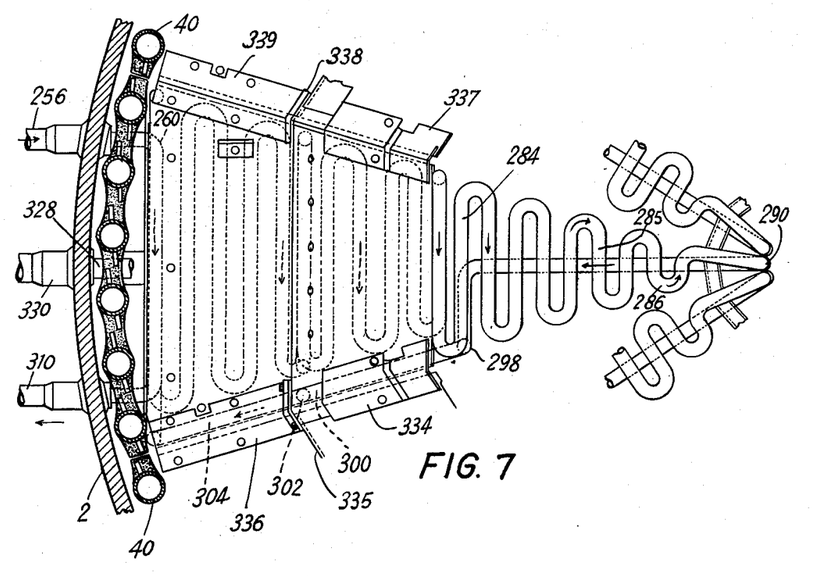
Fig. 7 is a partial plan of the economizer baffle construction indicated in Fig. 6, taken from a position indicated by the line 7—7 and the associated arrow of Fig. 6.

At the inward end of the economizer section indicated in Figs. 6 and 7, there is a curved tubular section 290 having metallic studs such as 292 extending inwardly therefrom with the studs and this tubular section covered by refractory material.

Each economizer section such as that above described is so constructed and arranged that it is segmental in plan as indicated in Fig. 7. Thus, successive economizer sections around the installation will form a shield protecting the circular ring of headers 122, and with the inner roof sections form a roof for the reaction chamber.

Returning to the vaporizable liquid flow from the innermost part of each section of the economizer, as shown in Fig. 6, the flow continues, as indicated by the arrow 294, downwardly in the tubular section 296 forming a part of the reaction chamber roof. At the gas inlet the liquid flow is continued through an upright tubular section 298 at one side of the adjacent gas inlet, and then through a downwardly inclined tubular section 300 (Fig. 7). It further continues through the connected sections 302 and 304 to the return bend tubular section 306 (lower part of Fig. 6) from which it passes to the next succeeding section 308 and then through an outlet tubular section 310 extending through the wall of the shell 2. This section leads to an outlet header 311. This outlet section is pressure sealed to the shell wall in the same manner as the economizer inlet section 256. The plates 272 of the adjacent shield sections of the economizer are joined by juncture plates such as 334—339 (Fig. 7).

There is a boiler drain for each one of the convector sections, as indicated in Fig. 6. It includes a plurality of return bend tubular sections 320—325 connected in series and having communication with the liquid space of the header 122. The flow from these tubular sections continues through an outlet pipe 328 and is controlled by an appropriate and normally closed valve (not shown). A pressure seal at this position is provided by a thermal sleeve 330 welded to the shell at its inner end and to the pipe 328 at its outer end.

While in accordance with the provisions of the statutes, we have illustrated and described herein the best form of our invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. In a fluid heat exchange installation, a vertically extending cylindrical pressure vessel shell having a furnace or reaction chamber in its lower portion and a gas outlet port at its upper part, heat absorbing means disposed within the shell between the reaction chamber and the gas outlet port and including a circular arrangement of convector vapor generating units, each unit having such transverse dimensions that it will pass through said port when not joined to its tubular connections, an upper and a lower header for each unit, each unit also including a group of horizontally spaced upright tubes directly connecting the associated headers, and a vapor outlet tube extending upwardly from each upper header through the upper part of the shell and secured thereto to normally support its associated convector unit.

2. In a fluid heat exchange installation, a vertically extending cylindrical pressure vessel shell having a reaction chamber in its lower portion and a gas outlet port at its upper part, heat absorbing means disposed within the shell between the reaction chamber and the gas outlet port and including a circular arrangement of convector vapor generating units, each unit having such transverse dimensions that it will pass through said port when not joined to its tubular connections, an upper and a lower header for each unit directly connected by a group of horizontally spaced upright tubes, a vapor outlet tube extending upwardly from each upper header through the upper part of the shell and secured thereto and acting as a pendent support for the unit, a thermal shield including a platen of series connected return bend tubes disposed between the reaction chamber and each lower header, and refractory material associated with said return bend tubes and completing said shield.

3. In a fluid heat exchange installation, a vertically extending cylindrical pressure vessel shell having a reaction chamber in its lower portion and a gas outlet port at its upper part, heat absorbing means disposed within the shell between the reaction chamber and the gas outlet port and including a circular arrangement of vapor generating convector units, each unit having such transverse dimensions that it will pass through said port when not joined to its tubular connections, an upper and a lower header for each unit directly connected by a group of horizontally spaced upright tubes, a vapor outlet tube extending upwardly from each upper header through the upper part of the shell and secured thereto, a thermal shield including a platen of series connected return bend tubes disposed between the reaction chamber and each lower header, refractory material associated with said return bend tubes and completing said shield, a central baffle construction disposed adjacent the lower ends of said units and constituting part of the roof of the reaction chamber, series connected return bend stud tubes included in said roof, and refractory material associated with said roof return bend tubes and filling the spaces between them, the return bend sections of the roof being in series connection with the return bends of said shield.

4. In a fluid heat exchange installation, a vertically extending cylindrical pressure vessel shell having a reaction chamber in its lower portion and a gas outlet port at its upper part, heat absorbing means disposed within the shell between the reaction chamber and the gas outlet port and including a circular arrangement of vapor generating convector units, each unit having such transverse dimensions that it will pass through said port when not joined to its tubular connections, an upper and a lower header for each unit directly connected by a group of horizontally spaced upright tubes and means causing gases from the reaction chamber to flow over said tubes, said last named means including a series of segmental refractory baffles tapering inwardly in horizontal cross section and supported by said units so as to prevent gas bypassing of the banks of tubes of said units, said baffles being interposed relative to successive units.

5. In a fluid heat exchange installation, a vertically extending cylindrical pressure vessel shell having a reaction chamber in its lower part and a gas outlet port at its upper end, a circular arrangement of wall tube units arranged adjacent the wall of said shell, an upper and lower header included in each unit, a row of wall tubes in each unit connecting the upper and lower header of each unit, a liquid and vapor drum arranged exteriorly of said shell and adjacent said port, a cylindrical refractory wall for the reaction chamber arranged within the circular arrangement of wall tube units, a refractory bottom for the reaction chamber, tubular means connecting said lower headers with the liquid space of said drum and extending through the shell, said tubular means having radially arranged sections in contact with the floor of the reaction chamber for thermal protection of the floor, riser tubes communicating with the upper headers of said wall tube units and extending helically of the upper portion of the shell, said riser tubes extending through the shell wall above their helical portions and connected to the liquid and vapor drum, and metallic thermal sleeve means welded to the shell and to said riser tubes to provide pressure seals at the positions at which the tubes pass through the shell.

6. In a fluid heat exchange installation, a vertically extending cylindrical pressure vessel shell having a reaction chamber in its lower part and a gas outlet port at its upper end, a circular arrangement of wall tube units arranged adjacent the wall of said shell, an upper and lower header included in each unit, a row of wall tubes in each unit connecting the upper and lower header thereof, a liquid and vapor drum arranged exteriorly of said shell and adjacent said port, a cylindrical refractory wall for the reaction chamber arranged within the circular arrangement of wall tube units, a refractory floor for the reaction chamber, tubular means connecting said lower headers with the liquid space of said drum and extending through the shell, said tubular means having radially arranged sections in contact with the floor of the reaction chamber for thermal protection of the same, riser tubes communicating with the upper headers of said wall tube units and extending helically of the upper portion of the shell, said tubes extending through the shell wall above their helical portions and connected to the liquid and vapor drum, metallic thermal sleeve means welded to the shell and to said riser tubes to provide pressure seals at the positions at which the tubes pass through the shell, and a glass wool blanket secured to the shell and disposed between the shell and the wall cooling tubes to prevent gas laning and stressing of the wall tubes due to radially exerted forces.

7. In a fluid heat exchange installation, a vertically extending cylindrical pressure vessel shell having a reaction chamber in its lower portion and a gas outlet port at its upper part, heat absorbing means disposed within the shell and between the reaction chamber and the gas outlet port and including a circular arrangement of convector vapor generating units, each unit having such transverse dimensions that it will pass through said port when not joined to its tubular connections, an upper and a lower header for each unit directly connected by a group of horizontally spaced upright tubes, thermal shields each including a platen of series connected return bend tubes disposed between the reaction chamber and a lower header.

8. In a fluid heat exchange installation, a vertically extending cylindrical pressure vessel shell having a furnace or reaction chamber in its lower portion and a gas outlet port at its upper part, heat absorbing means disposed within the shell and between the reaction chamber and the gas outlet port and including a circular arrangement of vapor generating convector units, each unit having such transverse dimensions that it will pass through said port when not joined to its tubular connections, an upper and a lower header for each unit directly connected by a group of horizontally spaced upright tubes, a vapor outlet tube extending upwardly from each upper header through the upper part of the shell and secured thereto, a central baffle construction disposed between the lower ends of said units and constituting the roof of the reaction chamber, series connected return bend stud tubes included in said roof, and refractory material associated with said roof return bends and completing a section of the roof.

9. In a heat exchanger installation, a vertically elongated cylindrical pressure shell, a reaction chamber positioned in the lower portion of said shell, means to supply combustion reactants to said reaction chamber under a superatmospheric pressure, a plurality of vapor generating units arranged circumferentially within the upper portion of the shell, each of said units including a lower header and an upper header connected by spaced upright tubes, upright fluid discharge tubes extending from said upper headers through the upper shell head in a gas pressure tight and unit supporting structure, a vapor and liquid drum positioned above the level of the upper shell head, tubular connections from each of said discharge tubes to said drum, and liquid supply connections from the liquid space of the drum to lower header of each of said units.

10. In a fluid heat exchange installation, a vertically extending cylindrical pressure vessel shell having a reaction chamber in its lower part and a gas outlet port at its upper end, a circular arrangement of wall tube units arranged adjacent the wall of said shell, an upper and lower header included in each unit, a row of wall tubes in each unit connecting the upper and lower header for the unit, a liquid and vapor drum arranged exteriorly of said shell and adjacent said port, a cylindrical refractory wall for the reaction chamber arranged within the circular arrangement of wall tube units, a refractory bottom for the reaction chamber, and tubular means connecting said lower headers with the liquid space of said drum and extending through the shell, said tubular means having radially arranged sections in contact with the floor of the reaction chamber for thermal protection of the floor.

11. In a fluid heat exchange installation, a vertically extending cylindrical pressure vessel shell having a reaction chamber in its lower part and a gas outlet port at its upper end, a circular arrangement of wall tube units arranged adjacent the wall of said shell, an upper and lower header included in each unit, a row of wall tubes in each unit connecting the upper and lower header for the unit, a liquid and vapor drum arranged exteriorly of said shell and adjacent said port, a cylindrical refractory wall for the reaction chamber arranged within the circular arrangement of wall tube units, a refractory floor for the reaction chamber, tubular means connecting said lower headers with the liquid space of said drum and extending through the shell, said tubular means having radially arranged sections in contact with the floor of the reaction chamber for thermal protection of the same, and riser tubes communicating with the upper headers of said wall tube units and extending helically of the upper portion of the shell, said tubes extending through the shell wall above their helical portions and connected to the liquid and vapor drum.

12. In a heat exchanger installation, a vertically elongated cylindrical pressure vessel, a reaction chamber positioned in the lower portion of the pressure vessel, means to supply combustion reactants to said reaction chamber under a superatmospheric pressure, a plurality of vapor generating units arranged within the upper portion of the shell, each of said units including inlet header means and outlet header means connected by spaced upright tubes, upright fluid discharge tubes extending from said outlet header means through the top of the pressure vessel in gas pressure tight relation and secured to the pressure vessel to act as a pendent unit supporting structure, a vapor and liquid drum positioned exteriorly of the pressure vessel, tubular connections from each of said discharge tubes to said drum, liquid supply connections from the liquid space of the drum to lower header of each of said units, and pressure vessel wall cooling means disposed adjacent the inner surface of the pressure vessel from a position near the bottom of the reaction chamber to a position near the tops of the vapor generating units.

13. A gas generator for the preparation of synthesis gas and the like for the synthesis of hydrocarbons, oxygenated hydrocarbons and the like from feed materials such as carbonaceous materials and oxygen, comprising a relatively elongated and substantially vertical shell including a refractory-walled reaction chamber at the lower extremity thereof, reactant inlets in said reaction chamber, said reaction chamber having a refractory-walled partition extending across the upper portion thereof, openings in said last-named partition permitting product gases to enter an elongate tubular cooling passageway occupying the portion of said elongated shell which is directly above said partition, said elongate passageway having an outlet at the upper extremity thereof for the cooled product gases, a plurality of independent tube bundles disposed in spaced relationship about the walls of said elongate passageway, and spaced from the central portion to provide an open central space sufficient to accommodate any single tube bundle, each tube bundle comprising a plurality of essentially vertically extending tubes and a top and bottom header to which the tubes are attached, a steam tube extending upwardly from the top header and connected with the upper extremity of said shell suspending each tube bundle in operative position, and a releasable closure at the upper extremity of said shell permitting introduction and removal of a complete unitary tube bundle.

14. A gas generator in accordance with claim 13, wherein annularly spaced, vertically extending refractory walls project inwardly from the wall of said elongate, tubular passageway between adjacent tube bundles providing peripheral recesses therefor.

15. A gas generator for the preparation of synthesis gas and the like for the synthesis of hydrocarbons, oxygenated hydrocarbons and the like from feed materials such as carbonaceous materials and oxygen, comprising a relatively elongate and substantially vertical shell including a refractory-walled reaction chamber at the lower extremity thereof, reactant inlets in said reaction chamber, said reaction chamber having a refractory-walled partition extending across the upper portion thereof, openings in said last-named partition permitting product gases to enter an elongate tubular cooling passageway occupying the portion of said elongated shell which is above said partition, said elongate passageway having an outlet at the upper extremity thereof for the cooled product gases, a plurality of unitary bundles of cooling tubes disposed within said elongate passageway about the peripheral margin thereof, each tube bundle comprising a multiplicity of cooling tubes extending substantially vertically and an upper and lower header to which said tubes are joined at their extremities, an outlet steam conduit connected to the upper header and to the upper extremity of said shell suspending the tube bundle unit in position therein, and a removable closure at the upper extremity of said shell of sufficient size to permit each tube bundle unit to be withdrawn and inserted therethrough.

16. A gas generator for the preparation of synthesis gas and the like for the synthesis of hydrocarbons, oxygenated hydrocarbons and the like from feed materials such as carbonaceous materials and oxygen, comprising a relatively elongate and substantially vertical shell including a refractory-walled reaction chamber at the lower extremity thereof, reactant inlets in said reaction chamber, said reaction chamber having a refractory-walled partition extending across the upper portion thereof, openings in said last-named partition permitting product gases to enter an elongate tubular cooling passageway occupying the portion of said elongated shell which is above said partition, said elongate passageway having an outlet at the upper extremity thereof for the cooled product gases, a plurality of unitary bundles of cooling tubes disposed within said elongate passageway about the peripheral margin thereof, each tube bundle comprising a multiplicity of cooling tubes extending substantially vertically and an upper and lower header to which said tubes are joined at their extremities, an outlet steam conduit connected to the upper header and to the upper extremity of said shell suspending the tube bundle unit in position therein, a removable closure at the upper extremity of said shell of sufficient size to permit each tube bundle unit to be withdrawn and inserted therethrough, and means connecting each of said lower headers to the wall of the shell for slidable vertical movement relative thereto.

17. A gas generator for the preparation of synthesis gas and the like for the synthesis of hydrocarbons, oxygenated hydrocarbons and the like from feed materials such as carbonaceous materials and oxygen, comprising a relatively elongate and substantially vertical shell including a refractory-walled reaction chamber at the lower extremity thereof, reactant inlets in said reaction chamber, said reaction chamber having a refractory-walled partition extending across the upper portion thereof, openings in said last-named partition permitting product gases to enter an elongate tubular cooling passageway occupying the portion of said elongated shell which is directly above said partition, said elongate passageway having an outlet at the upper extremity thereof for the cooled product gases, a plurality of independent tube bundles disposed in spaced relationship about the walls of said elongate passageway, and spaced from the central portion to provide an open central space sufficient to accommodate any single tube bundle, each tube bundle comprising a plurality of essentially vertically extending tubes and a top and bottom header to which the tubes are attached, a steam tube extending upwardly from the top header and connected with the upper extremity of said shell suspending each tube bundle in operative position, a releasable closure at the upper extremity of said shell permitting introduction and removal of a complete unitary tube bundle, the downcomer tubes each extending through said shell and connecting with the lower header of each tube bundle unit to supply water thereto.

18. Apparatus for the generation of carbon monoxide by the reaction of oxygen with a carbonaceous fuel in a fluid state comprising a relatively elongate and substantially vertical cylindrical vessel, a refractory-walled reaction chamber in the lower portion of said vessel, reactant inlets in said reaction chamber, a refractory-walled partition extending across the upper portion of said reaction chamber, openings in said partition permitting gases from the reaction chamber to enter a cooling chamber occupying the portion of said vessel which is above said partition, an outlet at the upper extremity of said vessel for the egress of cooled product gases from the cooling chamber, a plurality of unitary bundles of cooling tubes within said cooling chamber disposed about the periphery of the vessel to form an annular array of cooling tube bundles with an unoccupied central space of a size sufficient to accommodate any single tube bundle, each tube bundle comprising a plurality of substantially vertical tubes and a top and bottom header to which the tubes are attached, means extending upwardly from the top header and connected with the upper extremity of said shell suspending each tube bundle in operative position, and a plurality of removable spaced baffles within said central space directing the flow of gases over said annular array of cooling tubes.

19. Apparatus for the generation of carbon monoxide by the reaction of oxygen with a carbonaceous fuel in a fluid state comprising a relatively elongate and substantially vertical cylindrical pressure vessel, a refractory-walled reaction chamber in the lower portion of said vessel, reactant inlets in said reaction chamber, a refractory-walled partition extendng across the upper portion of said reaction chamber, openings in said partition permitting gases from the reaction chamber to enter a cooling chamber occupying the portion of said vessel which is above said partition, a refractory lining along the walls of said vessel defining the cooling chamber, an outlet at the upper extremity of said vessel for the egress of cooled product gases from the cooling chamber, a plurality of cooling tubes adjacent the wall of said vessel in said refractory and extending along substantially the entire length of said reaction chamber and said cooling chamber, a plurality of unitary bundles of cooling tubes within said cooling chamber disposed about the periphery of the vessel to form an annular array of cooling tube bundles with an unoccupied central space of a size sufficient to accommodate any single tube bundle, each tube bundle comprising a plurality of substantially vertical tubes and a top and bottom header to which the tubes are attached, means extending upwardly from the top header and connected with the upper extremity of said shell suspending each tube bundle in operatve position, and a plurality of removable spaced baffles within said central space directing the flow of gases over said annular array of cooling tubes.

PAUL R. LOUGHIN.
PAUL M. BRISTER.
CHARLES H. WOOLLEY.

References Cited in the file of this patent

UNITED STATES PATENTS

| Number | Name | Date |
|---|---|---|
| 1,793,867 | Niclausse et al. | Feb. 24, 1931 |
| 1,809,270 | Gleichmann | June 9, 1931 |
| 2,454,943 | Reed | Nov. 30, 1948 |

FOREIGN PATENTS

| Number | Country | Date |
|---|---|---|
| 217,990 | Germany | Jan. 29, 1910 |
| 604,373 | Great Britain | July 2, 1948 |